United States Patent [19]

Salvador Castillo

[11] 4,284,251
[45] Aug. 18, 1981

[54] BEARING FOR SUPPORTING ROLLS OF PAPER

[76] Inventor: Carmen Salvador Castillo, C/Miramar, 18-8°-31a, Gandia (Valencia), Spain

[21] Appl. No.: 37,148

[22] Filed: May 8, 1979

[30] Foreign Application Priority Data

May 17, 1978 [ES] Spain .................................. 236.056

[51] Int. Cl.³ ........................ B65H 75/24; B23B 31/40
[52] U.S. Cl. .............................. 242/68.4; 242/72.1; 279/2 R
[58] Field of Search ................... 242/68.2, 68.4, 72 R, 242/72.1, 73; 279/2 R

[56] References Cited

U.S. PATENT DOCUMENTS

| 1,527,866 | 2/1925 | Hall ..................................... 279/2 R |
| 4,148,444 | 4/1979 | Hehner ................................ 242/72.1 |
| 4,149,682 | 4/1979 | Gustafson et al. .................. 242/72.1 |

FOREIGN PATENT DOCUMENTS 505287 9/1951 Belgium ................................. 242/72.1
1034555 7/1958 Fed. Rep. of Germany .......... 242/68.4
1140428 11/1962 Fed. Rep. of Germany ............. 279/2
318655 3/1972 U.S.S.R. ...................................... 279/2

*Primary Examiner*—Richard R. Stearns
*Attorney, Agent, or Firm*—Wenderoth, Lind & Ponack

[57] ABSTRACT

A bearing for supporting rolls of paper includes a pair of identical devices, each of which is formed of two telescopically coupled elements jointly forming an axially expandable cone. The free end of a first element has a flange to be connected to a member which is capable of rotating and reciprocating movement. Between the two elements is an expansion spring which maintains them in a position of maximum extension corresponding to an inoperative position. A surface of the first element is provided with a series of channels made according to the generatrix thereof, in which slide plates which can project through openings made in the side surface of the second element. The first element has an annular expansion acting as a support for one of the openings of a cylindrical tubular core on which a sheet of paper forming the roll is wound.

3 Claims, 3 Drawing Figures

BEARING FOR SUPPORTING ROLLS OF PAPER

BACKGROUND OF THE INVENTION

This invention is directed to a bearing for supporting rolls of paper. The bearing is made up of a pair of devices which are identical to each other and which have a core housed between each other. The core is generally tubular in shape and has a circular section, on which a strip of paper is wound to thus form the roll itself.

SUMMARY OF THE INVENTION

The object of the invention includes serving as a bearing for unwinding the paper which is wound on the hollow cylindrical core.

In operation, the devices which make up the bearing permit the fastening of the assembly of the roll of paper therebetween. The two devices, which should penetrate through opposite openings of the core, are capable of moving approximately a like amount during which time they will rest in the two openings of the described core so that the core will rest on annularly expandable portions which are included in each one of said devices. The positioning of the devices in the openings in the core will cause the projection of claw-like plates which will press on the surface or inner walls of the tubular core to thus fix the core into a condition for turning. The turning of the tubular core will be accompanied by a rotating movement of the two devices which are positioned in the openings in the roll or, in other words, in the core making up the roll.

Each one of the devices described is made up of a pair of elements, one of which is coupled, at least partially, inside the other thus, making up a body which can be defined as a cone which is capable of expanding in an axial direction as a result of an expansion spring which is housed between the two coupled elements. The spring maintains them in a position of maximum extension.

The rotating movement of each one of the devices can occur because a flange is provided between the two coupled elements which results in one of the coupled elements being capable of rotation.

The elements, in addition to being capable of rotating movement, will also be capable of reciprocating movement.

The devices will be positioned oppositely facing each other in a horizontal direction, so that when the devices are expanded the most the separation between both devices will be such that it will be possible to position the tubular core on which a strip of paper should be wound to form a roll between the two devices. After this is done, the devices will be positioned such that the arms which are part thereof will be situated in the interior of the tubular core of the roll where, in addition, the plates, with which each device is provided, will project and press on the inner walls of the core, so that the core will thus be engaged for rotation which will immediately take place.

Once the paper is rolled onto the core the turning of the device on which the core is mounted will be stopped and then, the core and rolled paper will be withdrawn from the device so the roll can be transferred to, for example, a storehouse.

It is noted that the bearing of the present invention can also be used for unwinding a roll of paper; in which case the operations which have just been described for assembling the roll are performed in reverse order.

The structural characteristics, as well as the operation of the invention will be better understood from the following detailed description, taken with reference to the accompanying drawings, in which the following is illustrated:

BRIEF DESCRIPTION OF THE DRAWINGS

FIG. 2 illustrates the device in its inoperative position, i.e. with the two main elements mounted telescopically, and in its position of maximum extension.

DETAILED DESCRIPTION OF THE INVENTION

Figure 2:
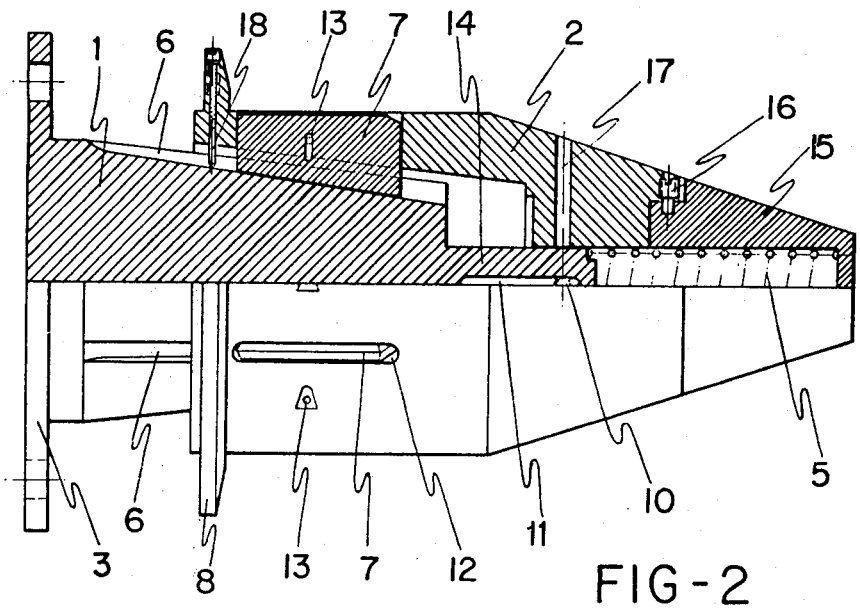
FIG. 2 is a partly cross sectional view, in elevation, of one of the devices shown enlarged with respect to the size as shown in FIG. 1.
Figure 3:
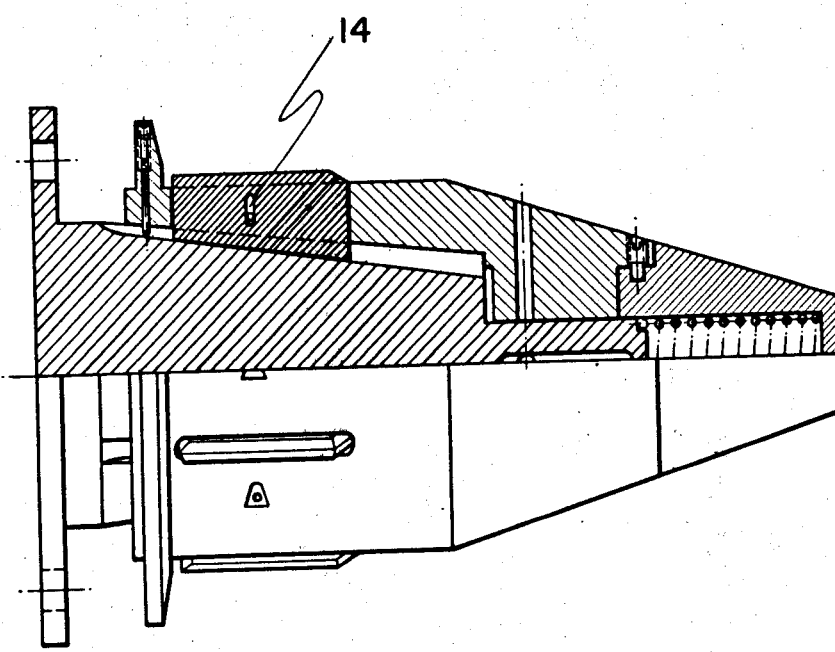
FIG. 3 is a view similar to the view of FIG. 2, wherein the two elements are in a position of maximum proximity, corresponding to the state in which the core of the roll has been secured by the plates which, when one of the elements of each device slides on the other, project to press on the inner surface of the tubular core.

Referring to FIGS. 2 and 3, it can be seen that both devices which make up the bearing which support the roll include a pair of elements which are designated 1 and 2, one of which is mounted inside the other.

Inner element 1 is preferably truncated and includes, at its larger base, a flange 3 which is joined to a rotating arm 4, the arm 4 is, at the same time, capable of reciprocating movement.

Inner element 1, at its smaller base, has a projection 14 which can be cylindrical, and which has a groove 11, the purpose of which will be subsequently described.

Outer element 2, with reference to its external shape, includes a first cylindrical portion, and on the inside has a shape which corresponds to the truncated shape of inner element 1.

Outer element 2 preferably has an endpiece 15 attached thereto. The endpiece 15 is a hollow truncated cone which includes a hole which extends inward from its larger base, so that an expansion spring 5 can be located in the hole. One end of the spring will rest on the free base of the protrusion 14 which is a part of inner element 1, and the other end of the spring 5 will rest on the bottom or inner part of the free or narrow end of endpiece 15.

The endpiece 15, which, on the outside appears to be a continuation of the truncated zone of outer element 2, is attached thereto by means of one or more screws, such as those indicated by the number 16. The screws 16 penetrate through holes which are located in the truncated side surface of the outer element 2. The holes are threaded and extend into the endpiece 15.

Referring to FIGS. 2 and 3, it can be seen that outer element 2 can be axially displaced with respect to inner element 1, and the maximum extension of movement, i.e. that as shown in FIG. 2, is limited by the butt which is made up of a pin 10 which is housed in slot 11 which is located in the protrusion 14 of inner element 1. In other words, when at rest, the spring 5 forces outer element 2 to be positioned at its maximum extension away from and with respect to inner element 1. When both elements 1 and 2 are in this condition, they are prevented from becoming uncoupled by the butt which is made up of pin 10 which is located at the end of slot 11.

The truncated portion of inner element 1, which is the main portion, includes a series of channels 6 which define a gradient, i.e. they become deeper as they become separated from the larger base of said truncated zone pertaining to 1.

The edges of plates 7 which, as can be seen in FIGS. 2 or 3, are trapezoidal in shape and are housed in complementary shaped openings 12 which are located in the cylindrical side surface of outer element 2, rest in the channels 6 and, more specifically, on the corresponding bottoms thereof.

Referring to FIG. 2, it can be seen that the plates 7, in the position of maximum extension of the device, are level or slightly withdrawn with respect to the cylindrical side surface of outer element 2. However, when the piece 2 slides onto 1, or the device is shortened, as illustrated in FIG. 3, in a direction opposite to the tension of spring 5, the plates 7 project to a certain extent, through the openings 12 since they are caused to slide, while resting on the bottom of each channel 6.

It can be seen that plates 7 have a transversely extending groove which includes a pin 13 which prevents the undesired detachment of each one of said plates 7 from the device.

Figure 1:
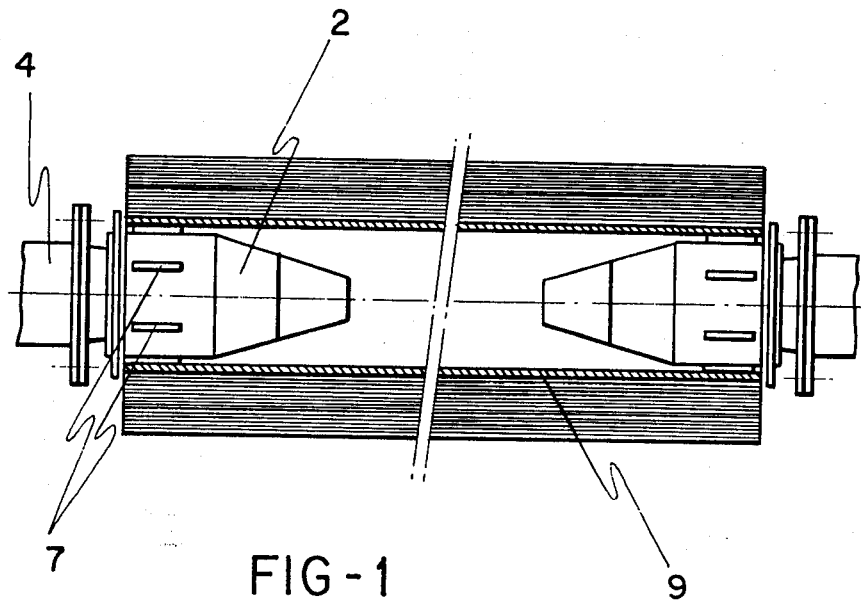
FIG. 1 is a schematic view of the bearing of the present invention which shows a longitudinal section view of the roll of paper, the core of which is secured between the two devices which make up the bearing itself.

The penetrating movement of element 2 into 1, i.e. the change over from the position illustrated in FIG. 2 to that of FIG. 3, occurs when the opening of core 9 of the roll rests on the annular flange 8 which, is shaped like a flap, and is located at the end of outer element 2. Thus, as shown in FIG. 1, when the described devices are in position on the core, since they face each other, a compression will be generated which causes the penetration of element 2 into 1, overcoming the tension of spring 5.

It will be understood that the sliding of 2 on 1 is precisely guided by the plates 7 which are partially housed in the corresponding channels 6.

In addition, the displacement will be guided by additional pivots 18, the annular flange 8 including a variable number thereof, which are permanently urged into a contact position against the bottom of channels 6 as a result of the force which is exerted by a spring which is housed in the annular flange 8, wherein the pins 18 are located, and retained by means of a screw, as illustrated in FIGS. 2 and 3.

Finally, there is a hole 17, which is a greasing channel for achieving good lubrication between the protrusion 14 and the hole in element 2 and complementary endpiece 15, since friction will occur between said zones which should be maintained adequately lubricated.

I claim:

1. A bearing apparatus for supporting rolls of paper, said rolls of paper being wound on tubular cores, said bearing apparatus comprising:
   first and second mounting means spaced opposite each other for mounting a tubular core therebetween, each said first and second mounting means comprising;
   a first cone-like shaped member, said first cone-like shaped member being hollow and having an opening at one end and having a plurality of holes spaced along the periphery of the side wall thereof;
   a second cone-like shaped member having a shape for being telescopically slidably received in said opening in said first cone-like shaped member for moving between a first fully extended position to a second non-extending position relative to said first cone-like shaped member, said second cone-like shaped member having a flange, extending outwardly therefrom at one end away from another end which is received in said first cone-like shaped member, for being engaged by a means for causing said bearing apparatus to both move reciprocatingly in a horizontal direction and rotate, said second cone-like shaped member having a plurality of channels along the periphery of the outer side wall, each channel located for being in alignment with each hole of said plurality of holes in said first cone-like shaped member;
   spring means positioned between said first and second cone-like shaped members for urging said cone-like shaped members apart into said first fully extended position; and
   a plurality of plates, each plate of said plurality of plates received and slidable in individual ones of said plurality of channels and extending into a corresponding hole of said plurality of holes, each one of said channels having a tapering depth for causing said plurality of plates to project beyond the outer edge of said plurality of holes when said second cone-like shaped member is in said second non-extending position.

2. A bearing apparatus as in claim 1 further comprising slot means and pin means, said pin means located in said first cone-like shaped member and extending into said slot means, said slot means located in said second cone-like shaped member, for limiting relative movement of said first and second cone-like shaped members between said first fully extended position and said second non-extended position.

3. A bearing apparatus as in claim 1 further comprising plate pin means attached to said first cone-like shaped member, said plurality of plates having plate slot means extending therethrough for receiving said plate pin means for limiting the distance said plurality of plates project beyond the outer edge of said plurality of holes when said second cone-like shaped member is in said second non-extended position.

* * * * *